(12) United States Patent
Hickey

(10) Patent No.: US 7,671,541 B2
(45) Date of Patent: Mar. 2, 2010

(54) DIODE LAMP FOR SIMULATING A FILAMENT LAMP, AND LAMP MONITORING METHOD

(75) Inventor: Robert J. Hickey, Inverness, IL (US)

(73) Assignee: Video Refurbishing Services, Inc., West Dundee, IL (US)

( * ) Notice: Subject to any disclaimer, the term of this patent is extended or adjusted under 35 U.S.C. 154(b) by 60 days.

(21) Appl. No.: 11/811,915

(22) Filed: Jun. 12, 2007

(65) Prior Publication Data

US 2008/0309257 A1    Dec. 18, 2008

(51) Int. Cl.
H05B 37/02    (2006.01)
(52) U.S. Cl. .................. 315/307; 315/291; 315/308
(58) Field of Classification Search .......... 315/291, 315/307, 308; 362/600
See application file for complete search history.

(56) References Cited

U.S. PATENT DOCUMENTS

| | | | |
|---|---|---|---|
| 4,475,196 A | 10/1984 | LaZor | |
| 5,377,087 A | 12/1994 | Yoon | |
| 6,276,822 B1* | 8/2001 | Bedrosian et al. | 362/545 |
| 7,153,008 B2 | 12/2006 | Grote, III et al. | |
| 2005/0218835 A1* | 10/2005 | Suzunaga et al. | 315/291 |
| 2007/0024213 A1* | 2/2007 | Shteynberg et al. | 315/291 |
| 2009/0167190 A1 | 7/2009 | Hickey | |

* cited by examiner

*Primary Examiner*—Douglas W Owens
*Assistant Examiner*—Jianzi Chen
(74) *Attorney, Agent, or Firm*—Thompson Coburn LLP; Benjamin L. Volk, Jr.

(57) ABSTRACT

An LED-based lamp assembly or diode lamp assembly effectively replaces a filament or incandescent type lamp assembly for cabin/compartment reading light applications for reducing power consumption and improving fuel efficiency. The diode lamp assembly comprises a light-emitting diode in circuit with peripheral components for effecting or simulating a low resistance through the diode lamp assembly. The simulation of a low resistance via the diode lamp assembly appears the same as the normal operation of a filament lamp assembly to existent circuit polling mechanisms so that the latter need not be replaced. Rather, the targeted element to be replaced is a relatively high power consumption filament lamp. A lamp monitoring method is further disclosed as bootstrap-supported by the teaching of the diode lamp assembly.

26 Claims, 5 Drawing Sheets

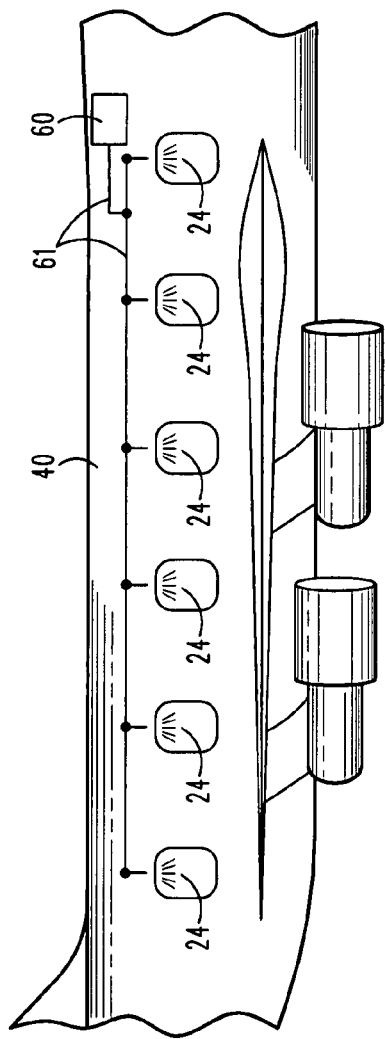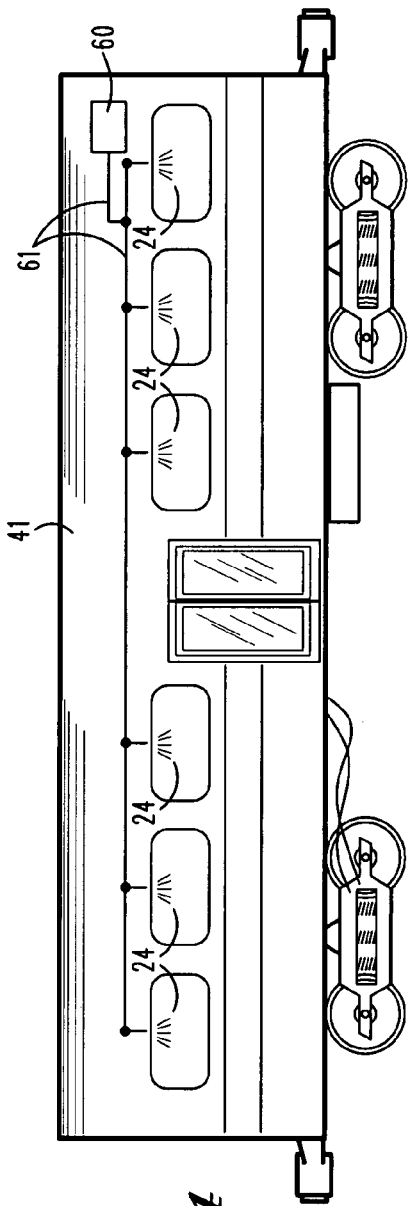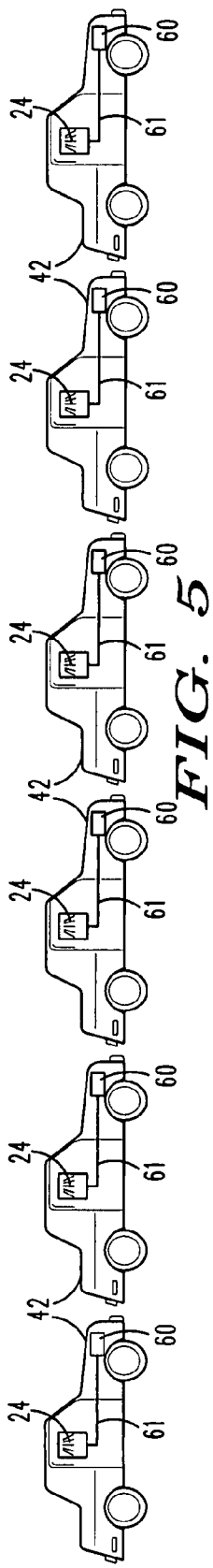

DIODE LAMP FOR SIMULATING A FILAMENT LAMP, AND LAMP MONITORING METHOD

BACKGROUND OF THE INVENTION

1. Technical Field

The present invention generally relates to a light-emitting diode (LED) type cabin reading light. More particularly, the present invention pertains to an LED type cabin reading lamps for replacing state of the art filament lamps used on aircraft and similar other transportation vehicles, and method for monitoring the same.

2. Description of the Prior Art

According to classical physical principles, power (P) is the rate at which work is performed or energy is transferred. In other words, power may be defined as the amount of energy required or expended in a given unit of time. In the International System of Units (SI) system of measurement, power is measured in watts (W). One watt is equivalent to one joule of energy transfer per second. The instantaneous electrical power (P) delivered to an electrical component is given by the relation: $P(t)=I(t) \cdot V(t)$, where $P(t)$ is the instantaneous power, measured in watts, $V(t)$ is the potential difference (or voltage drop) across the component, measured in volts; and $I(t)$ is the current flowing through it, measured in amperes. If the component is a resistor, then: $P=I^2 \cdot R=V^2/R$ where $R=V/I$ is the resistance, measured in ohms.

Exemplary state of the art filament-based reading lamps used on aircraft such as the Boeing 777 and 747-400 (such as Model Nos. 2059 and 2058X) may consume 10 watts with an average lamp life of approximately 8,000 hours. Further, filament-based reading lamps used on aircraft such as the Boeing DC-9, 737, 757, and 767 (such as Model Nos. 2232, 2233, 2233B, 307SB, and 674SB) may consume 44 watts with an average lamp life of about 2,000 hours. Notably, the lamp-operating power is consumed from a burnt fuel-based source on board the aircraft. If the filament type reading lamps could be replaced with lamps that consume less power with substantially equivalent lumen intensity with a substantially longer average lamp life (such as an LED type lamp), the replacement lamp could well cut fuel usage and operating cost during the life of the replacement lamp.

Similar to a conventional diode, a light-emitting diode or so-called "LED" comprises a chip of semi-conducting impurity-doped material so as to create a junction. As in other diodes, current flows easily from the cathode side of the junction to the anode side or the junction, but not in reverse. Charge-carriers flow into the junction from electrodes with a potential difference therebetween. When charge carriers fall into lower energy levels, energy is released in the form of photons (light), thereby emitting light as a light-emitting diode or LED.

It should be noted that the prior art is not silent in terms of cabin reading light-type lamp assemblies and means for monitoring the same. Some of the more pertinent prior art relating to cabin reading light assemblies; certain means for enabling the use of light-emitting diode lamp assemblies in combination with existing filament or incandescent lamp assemblies; and lamp system monitoring means are briefly set forth in U.S. Pat. Nos. 5,377,087; 7,153,008; and 4,475,196, respectively. These abstract type descriptions of these disclosures are set forth hereinafter.

U.S. Pat. No. 5,377,087 ('087 patent), which issued to Yoon, discloses a Passenger Reading Light. The '087 patent teaches an orientable passenger reading light assembly for vehicles, which light assembly comprises a two-part removable bezel arrangement. The lower part of the bezel is freely rotatable to disguise the method of relamping by requiring correct manipulation of the upper bezel part to allow release and removal of the bezel arrangement. A continuously adjustable ball and socket arrangement permits varying the orientation of the light over a wide range such as a 25 degree spherical zone. A simplified locking mechanism may be engaged in any position without tools, to prevent adjustment by passengers. When the locking mechanism is disengaged, enough friction is provided to maintain the orientation despite environment vibration.

U.S. Pat. No. 7,153,008 ('008 patent), which issued to Grote, III et al., discloses a Conversion Cradle Incandescent Lamp to LED Lamp. The '008 patent teaches an LED lamp mounting assembly for use in motor vehicle lamps. The LED lamp mounting assembly preferably connects a LED lamp to a pre-existing incandescent lamp socket in a motor vehicle. The LED lamp mounting assembly therefore allows a LED lamp to be operated from incandescent lamp hardware. In one embodiment, the LED lamp mounting assembled includes a LED lamp assembly, a heat sink, a cradle, printed circuit boards and an electrical connector. The electrical connector is insertable into the incandescent lamp socket and connects to the printed circuit boards. The printed circuit boards power the LED lamp assembly and the heat sink adsorbs excess heat created by the LED lamp assembly. The motor vehicle lamp becomes a LED lamp without any changes to the existing incandescent lamp hardware.

U.S. Pat. No. 4,475,196 ('196 patent), which issued to La Zor, discloses an Instrument for Locating Faults in Aircraft Passenger Reading Light and Attendant Call Control System. The '196 patent teaches a testing instrument especially adapted for use in locating faults in the passenger reading light and flight attendant call control systems which are used in jumbo jetliners. The testing instrument includes a selection means for designating one of a plurality of series connected passenger locations. Each passenger location includes a proximately located group of two or three passenger seats. The instrument includes indicators for registering data transmitted from the passenger location to a section timer that controls input from and output to passenger locations in an aircraft cabin on a timed, multiplexed basis. The instrument also monitors transmission of data from the section timer to the selected passenger location and includes detectors for registering faults in timing and parity pulses. The instrument includes test controls to create particular conditions of the reading light and attendant call controls, and also a meter for detecting abnormalities in voltage drops at each of the serially connected passenger locations.

It may seen from a consideration of the foregoing disclosures as well as from a general consideration of the related arts, that the prior art does not teach a self-contained light-emitting type diode lamp assembly, which may effectively function to replace filament type or incandescent type lamp assemblies by simulating a low resistance through the diode lamp assembly such that means for detecting high resistance or breaks in filament type circuits do not otherwise prompt bulb replacement signals when a high resistance light-emitting diode is placed into a socket designed to receive low resistance incandescent lamps. The prior art thus perceives a need for a diode lamp assembly according to the foregoing specifications.

SUMMARY OF THE INVENTION

Accordingly, it is primary object of the present invention to provide a diode lamp assembly comprising a light-emitting diode in circuit with other components for effecting a low resistance lamp assembly. Such a lamp assembly may thus replace commonly and currently used filament lamp assemblies having normally low resistance when in a functional/operative state. To this end, the diode lamp assembly according to the present invention may be said to essentially comprise first and second current paths intermediate a constant potential difference for driving current through the current paths. The first current path comprises the light-emitting diode and a load-type resistor. The second current path comprises a low resistance resistor in series with a current-limiting diode. As stated, a potential difference or constant voltage is applicable across the first and second current paths for driving current through the first and second current paths enabling light emission from the light-emitting diode.

The remaining components function to simulate a low resistance across the current paths such that peripheral resistance detection means may "see" or detect a low resistance from the circuit and report a "no lamp replacement" signal to peripheral operators. The low resistance resistor may preferably comprise a resistance ranging from 1 to about 600 ohms, depending on the application. The resistance detection means may be preferably defined by computer-driven circuitry that otherwise function to provide a lamp replacement signal when detecting a relatively high resistance through a filament lamp which is the target element for replacement by the diode lamp assembly of the present invention.

BRIEF DESCRIPTION OF THE DRAWINGS

Other features of my invention will become more evident from a consideration of the following brief description of patent drawings:

FIG. 3 is a fragmentary side view depiction of an aircraft depicting a plurality of reading light stations each of which comprise the reading light assembly otherwise generically depicted in FIG. 1.

FIG. 4 is a fragmentary side view depiction of a train car depicting a plurality of reading light stations each of which comprise the reading light assembly otherwise generically depicted in FIG. 1.

FIG. 5 is a fragmentary side view depiction of a plurality of automobiles, each of which comprises a reading light assembly otherwise generically depicted in FIG. 1.

DETAILED DESCRIPTION OF THE PREFERRED EMBODIMENT(S)

Figure 1:
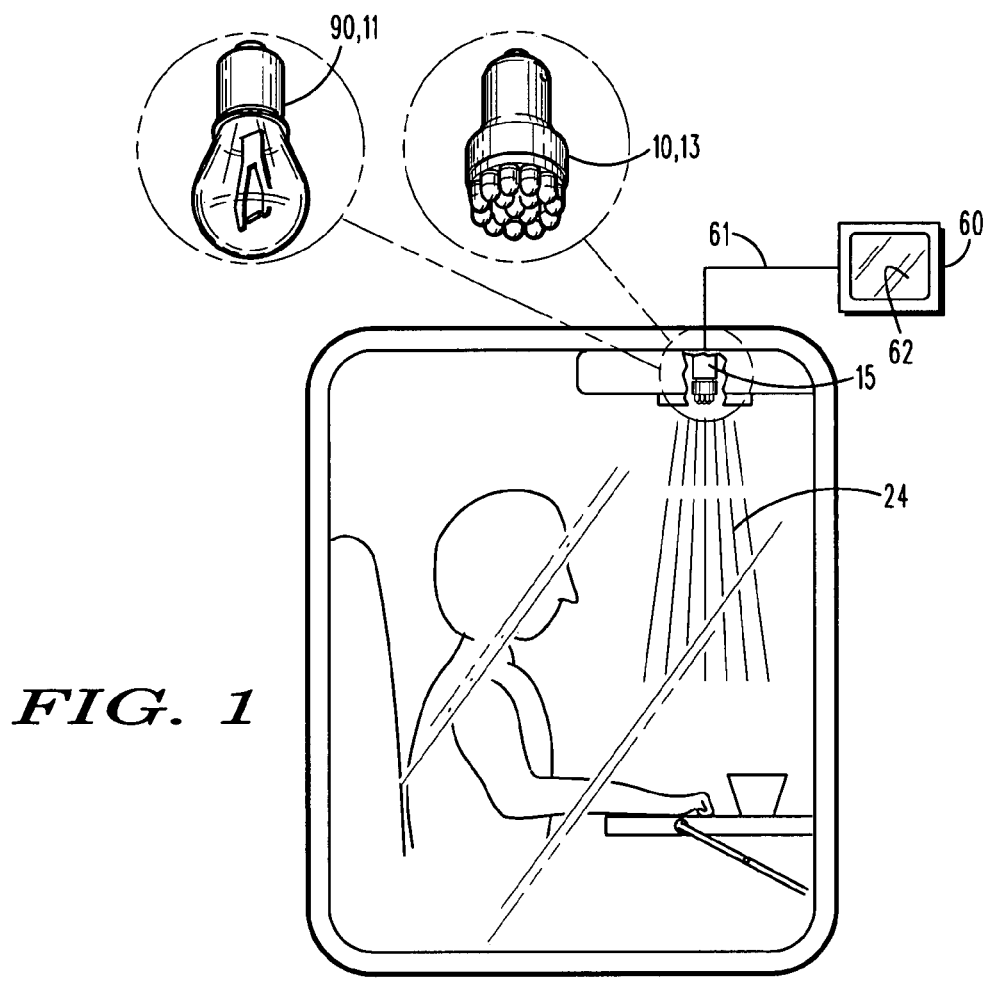
FIG. 1 is a generic depiction of a seated person behind a window under a reading light assembly, with an enlarged first depiction of a filament lamp and an enlarged second depiction of a replacement diode lamp as removed from the reading light assembly, which assembly is in communication with a lamp socket-monitoring computer.
Figure 2:
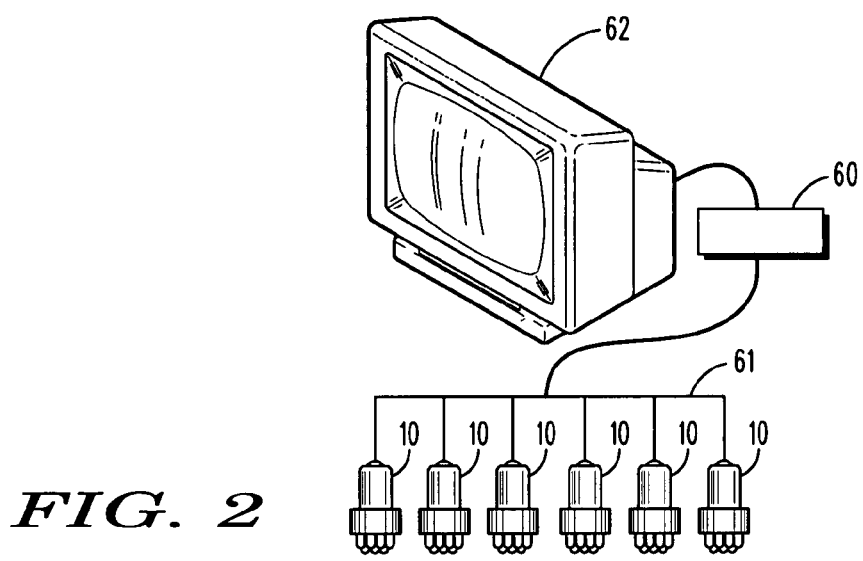
FIG. 2 is a depiction of the socket-monitoring computer otherwise depicted in FIG. 1 in electrical communication with a plurality of lamp assemblies for selectively polling the resistance across each lamp assembly.

Referring now to the drawings with more specificity, the preferred embodiment of the present invention generally concerns a replacement light-emitting diode type lamp assembly 10 for replacing filament type lamp assemblies otherwise cooperably inserted in cabin reading light or lamp sockets 15 aboard transportation vehicles such as aircraft 40, trains or train cars 41, and automobiles 42. The diode type lamp assembly 10 is self-contained so that the "to-be-replaced" filament lamp or filament lamp assembly 90 may be removed from a filament lamp-lighting socket 15 and the diode lamp assembly 10 simply inserted into the lamp-lighting socket 15 as generally depicted in FIG. 1.

Figure 8:
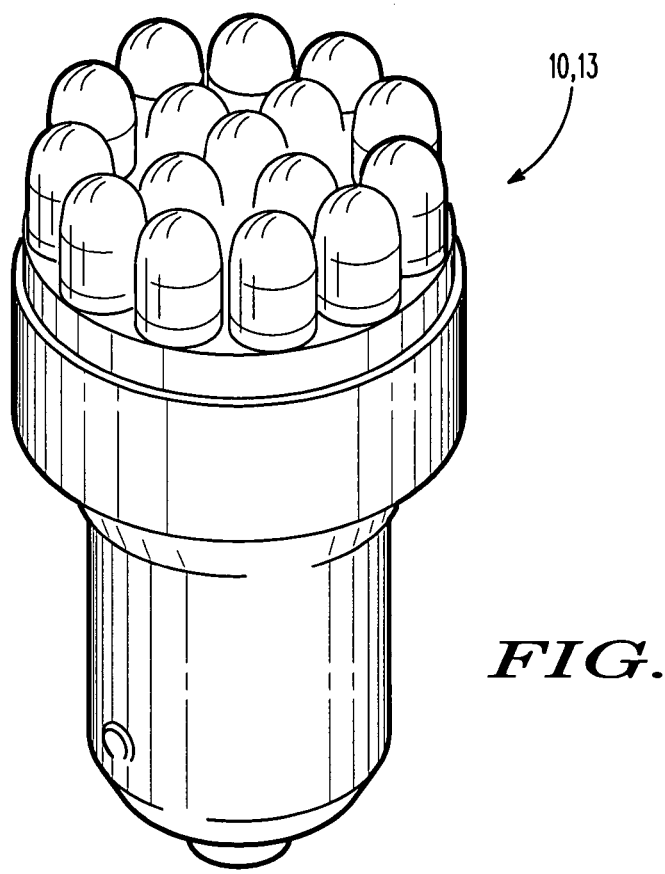
FIG. 8 is a top perspective view of a first diode lamp assembly according to the present invention.
Figure 9:
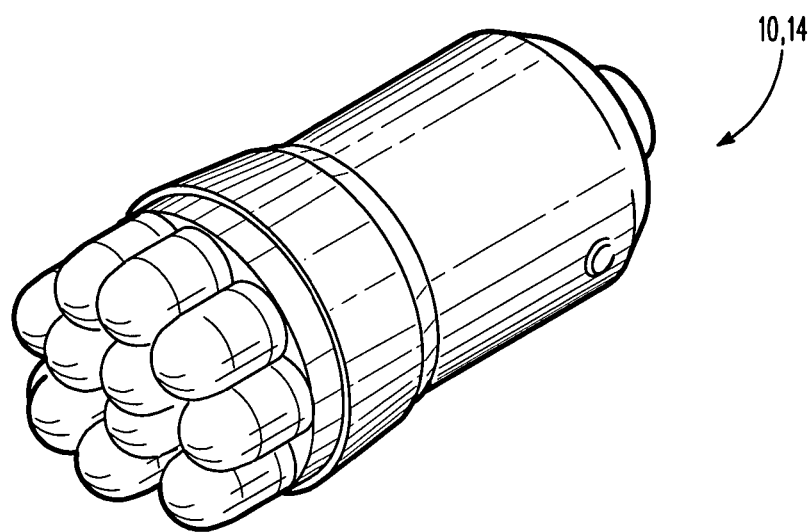
FIG. 9 is a lateral perspective view of a second diode lamp assembly according to the present invention.
Figure 10:
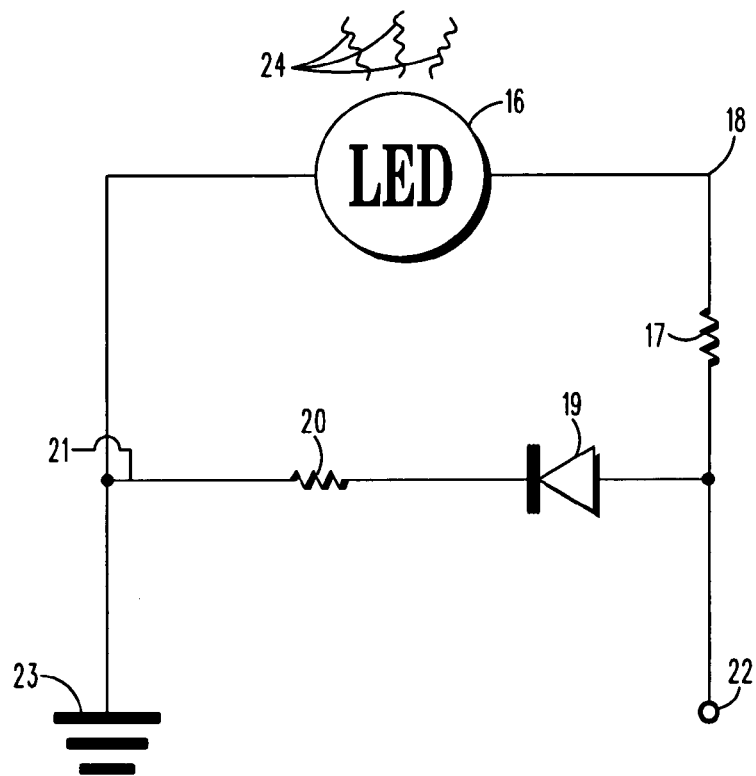
FIG. 10 is a circuit diagram of a first exemplary supporting circuit for operably emitting light from a light-emitting diode of the diode lamp assemblies otherwise depicted in FIGS. 8 and 9.
Figure 11:
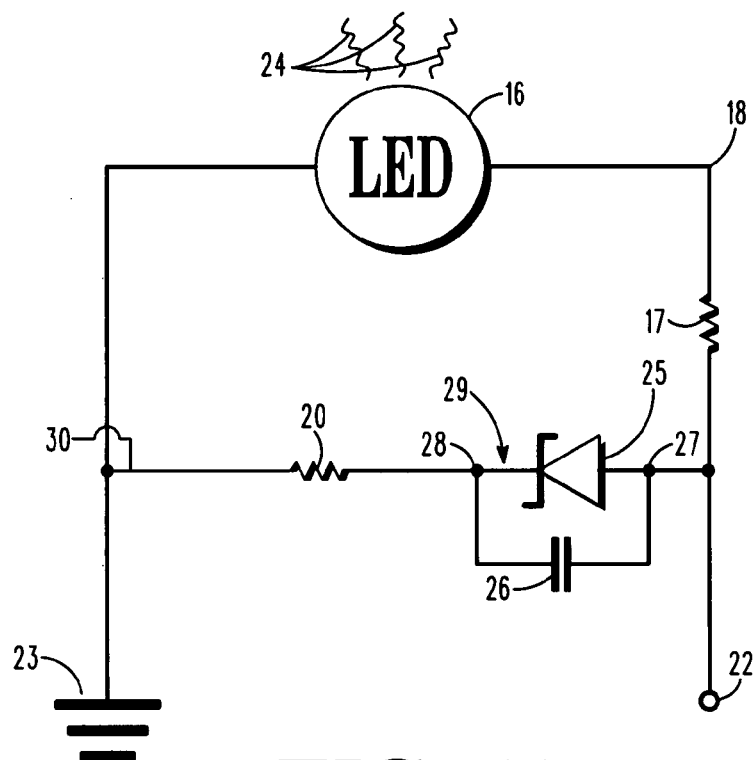
FIG. 11 is a circuit diagram of a second exemplary supporting circuit for operably emitting light from a light-emitting diode of the diode lamp assemblies otherwise depicted in FIGS. 8 and 9.

Certain preferred circuits for driving the diode lamp assembly 10 according to the present invention are diagrammatically illustrated and referenced in FIGS. 10 and 11, and certain preferred embodiments of the diode lamp assembly 10 are depicted and referenced in FIGS. 8 and 9. It should be readily understood from a comparative inspection of the noted figures, as well as from an understanding of the underlying field of inquiry, that a number of alternative methods or embodiments may be employed for finally effecting a replacement diode lamp assembly 10 according to the present invention.

Figure 6:
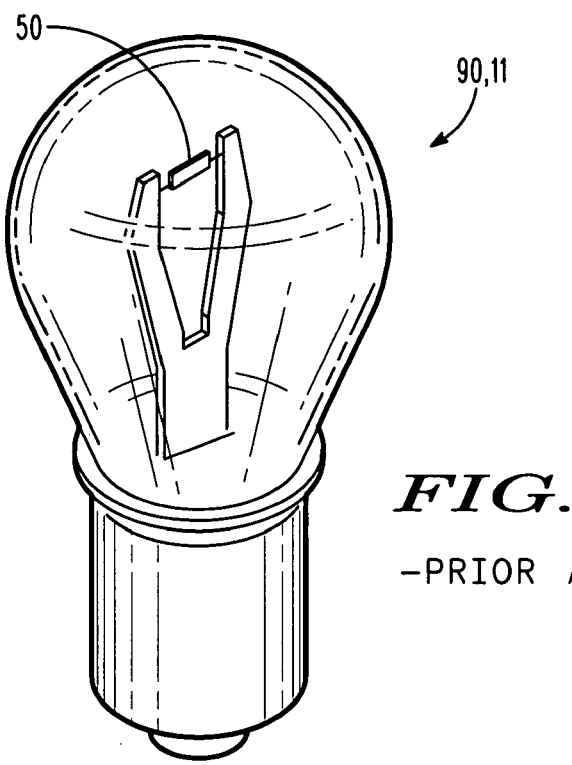
FIG. 6 is a top perspective view of a first prior art filament or incandescent type lamp assembly.
Figure 7:
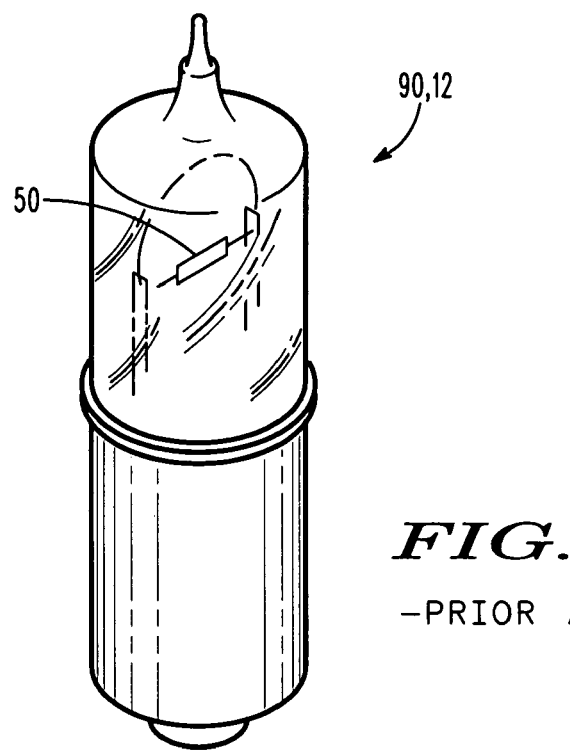
FIG. 7 is a top perspective view of a second prior art filament or incandescent type lamp assembly.

In any embodiment, it is contemplated that the diode lamp assembly 10 consumes relatively less power as compared to conventional filament lamp assemblies. A first filament lamp assembly 11 is generally depicted and referenced in FIGS. 1 and 6, and a second filament lamp assembly 12 is generally depicted and referenced in FIG. 7 for comparison purposes. It is contemplated that the illustrated filament lamp assembly 11 depicts a forty-four (44) watt cabin reading-type filament lamp assembly commonly and currently used aboard aircraft such as the BOEING DC-9, 737, 757, and 767 models. The average life of the assembly 11 is typically on the order of 2,000 hours. It is further contemplated that the illustrated filament lamp assembly 12 depicts a ten (10) watt cabin reading-type filament lamp assembly commonly and currently used aboard aircraft such as the BOEING 777, and 747-400 models, the average life of which is on the order of 8,000 hours.

A first alternative embodiment 13 of the diode lamp assembly 10 according to the present invention is generally depicted and referenced in FIGS. 1 and 8. It is contemplated that the embodiment 13 may effectively function to simulate and replace the filament lamp assembly 11 after insertion into the lamp-lighting socket 15 as generally depicted and referenced in FIG. 1. Operating off of, or in electrical communication with, a Direct Current (DC) or constant voltage source (potential difference) of 28 volts, both assembly 11 and embodiment 13 may effectively function to provide effective illuminance 24 for a cabin reading light. However, embodiment 13 comprises an average wattage rating of 1.4 watts as compared to the 44 watts of assembly 11, which translates into a great reduction of power consumption and fuel savings. More specifically, the embodiment 13 consumes 97% less power, which translates into a fuel savings of approximately 6.5 gallons based on a one hour aircraft flight and 100 seats. Moreover, the average life of embodiment 13 is on the order of 50,000 hours, or roughly 25 times the average life of assembly 11.

A second alternative embodiment 14 of the diode lamp assembly 10 is generally depicted and referenced in FIG. 9. It is contemplated that the embodiment 14 may effectively function to simulate and replace the filament lamp assembly 12 after insertion into the lamp-lighting socket 15. Operating in electrical communication with a constant voltage source or potential difference of 12 volts, both assembly 12 and embodiment 14 may effectively function to provide effective illuminance 24 for a cabin reading light. However, embodiment 14 comprises an average wattage rating of 1.8 watts as compared to the 10 watts of assembly 12, which also translates into a reduction of power consumption and fuel savings. More specifically, the embodiment 14 consumes 82% less power, which translates into a fuel savings of approximately 2.5 gallons based on a one hour aircraft flight and 200 seats. Moreover, the average life of embodiment 14 is on the order of 50,000 hours, or roughly 5.25 times the average life of assembly 12.

It is contemplated that embodiments 13 and 14 may effectively function as relatively low power consumption diode lamps for replacing relatively high power consumption filament lamps. Notably, however, when certain resistance detection means for detecting resistance in a circuit are in communication with an intact filament lamp type circuit (i.e. the filament 50 of the filament lamp is not severed), the circuit shows or exhibits relatively low resistance to current flow as detected by the resistance detection means. Diode lamps, when operable and in isolation, typically show a high resistance to current flow. If the filament lamps aboard an aircraft 40 were simply replaced with light-emitting diodes, for example, the resistance detection means (as may be defined by onboard computer (as at 60)-driven type circuitry as at 61) would be able to poll the diodes and provide a "lamp replacement" signals for each of the diodes, since a high resistance would be detected at each diode site.

Central to the practice of the present invention is the incorporation of certain means for simulating a low-resistance through or across an operable light-emitting diode assembly such that the resistance detection means may "see" or detect a low resistance through or across the circuit and provide a signal for indicating that the diode-based lamp is operable and not in need of replacement or a "no lamp replacement" signal. It is contemplated that the onboard computer 60 circuitry 61 may be preferably embodied by a simplified bit/byte system for providing simplified on-off or 0-1 type signals to the visual output display as at 62 for the operators' convenience.

The embodiments 13 and 14 may thus be said to preferably comprise, in a first preferred configuration, a light-emitting diode 16, and a load resistor 17 as both referenced in FIGS. 10 and 11. From an inspection of the noted figures, it may be seen that the load resistor 17 is placed in series with the light-emitting diode 16 for forming a two-component, first current path as at 18. The embodiments 13 and 14 may further comprise a current-limiting diode 19 as referenced in FIG. 10; and a relatively low resistance resistor 20, which low resistance resistor 20 is placed in series with the current-limiting diode 18 for forming a two-component, second current path as at 21.

Preferably, the resistance rating for the relatively low resistance resistor 20 is contemplated to be on the order of 1-60 ohms or within a resistance range ranging from 1-600 ohms.

A potential difference or constant voltage is applicable across the first and second current paths 18 and 21 as at input voltage 22 and ground 23 for driving current through paths 18 and 21 and enabling light emission 24 from the light-emitting diode 16. As earlier stated, it is contemplated that the low resistance resistor 20 may preferably comprises a select resistance as selected from a resistance range of 1 to about 600 ohms, depending on the application. Together, the load resistor 17, the current-limiting diode 19, and low resistance resistor 20 may effectively simulate low resistance through or across the light-emitting diode 16 across the paths 18 and 21 for preventing a lamp replacement signal to be messaged upon the visual output means 62 via the resistance detection means. It will be recalled that the resistance detection means as preferably defined by computer-driven circuitry otherwise function to provide a lamp replacement signal when detecting a relatively high resistance through filament lamp 90 (as when the filament lamp circuit is open, e.g. via a broken or spent filament 50).

The embodiments 13 and 14 may further be said to preferably comprise, in a second preferred configuration, the light-emitting diode 16, and the load resistor 17 as previously specified and referenced. Again, the load resistor 17 is placed in series with the light-emitting diode 16 for forming a two-component, first current path as at 18 in FIG. 11. However, in the second preferred configuration, the embodiments 13 and 14 further comprise a Zener diode as at 25, and a capacitor 26 having a preferred capacitance on the order of 4-10 picofarads (pF), which capacitor 26 is placed in parallel with the Zener diode 25 for forming a voltage-decaying path segment 29 intermediate points 27 and 28. In this regard, it should be noted that a charged capacitor will initially discharge very quickly through a forward-biased diode. However, given a diode current's nearly exponential dependence on voltage, a drastic reduction in the rate of discharge results from such a circuit segment. The voltage-decaying path segment 29 is placed in series with a relatively low resistance resistor 20 as previously specified for forming a three-component, third current path as at 30.

A potential difference or constant voltage is applicable across the first and second current paths 18 and 30 as at input voltage 22 and ground 23 for driving current through paths 18 and 30 and enabling light emission 24 from the light-emitting diode 16. Together, the load resistor 17, the Zener-diode 25, capacitor 26, and low resistance resistor 20 simulate low resistance through the light-emitting diode 16 across the paths 18 and 30. The capacitor 26 may be said to comprise a certain select capacitance, as selected from a capacitance range of 4-10 picofarads. The resulting low resistance simulation essentially functions to prevent a lamp replacement signal as detectable and reportable via the resistance detection means as perchance defined by bit/byte type computer circuitry 61. Said means, normally outfitted upon transport vehicles such as aircraft 40, train cars 41, and automobiles 42 otherwise function to provide a lamp replacement signal when detecting a relatively high resistance through the filament lamp assembly 90. The diode lamp assembly 10 is designed to work in combination with existing resistance detection means that selectively poll the circuit for breaks or regions of high resistance.

While the above description contains much specificity, this specificity should not be construed as limitations on the scope of the invention, but rather as an exemplification of the invention. For example, the foregoing teachings may be said to further support a low power consumption cabin reading lamp or diode lamp for replacing a relatively high power consumption cabin reading lamp or filament lamp, which diode lamp assembly essentially comprises a light-emitting diode or assembly thereof, and certain low-resistance simulating means for simulating low resistance across the light-emitting diode. A potential difference, when applied across the light-emitting diode and low-resistance simulating means functions to drive or effect an electric current or a stream of charge carriers through the diode and means elements thereby enabling light emission from the light-emitting diode. The diode lamp assembly is usable in combination with certain resistance detection means for detecting magnitudes of resistance through or across the diode lamp assembly, which means essentially function to provide a lamp replacement signal when detecting a high resistance through the diode lamp assembly.

It is further contemplated that the foregoing specifications may be said to support certain methodology for monitoring a lamp or a lamp/circuit-monitoring method, comprising a series of steps for testing a lamp socket or circuit including an initial step of removing a filament lamp assembly form a lamp socket or circuit and installing a diode lamp into the lamp socket or circuit. After installing the diode lamp assembly, a potential difference may be applied across the diode lamp via the lamp socket or circuit for sending current therethrough. A low resistance may be simulated through or across the diode lamp assembly such that when the circuit or socket is polled for a high resistance or fault scenario, the diode lamp assembly shows or exhibits a low resistance via certain means for simulating a low resistance. When polling the socket or circuit, the method may comprise certain additional steps of outputting a first signal such as "no lamp replacement" if a low resistance is poll-detected, or outputting a second signal such as a "lamp replacement" signal if a high resistance is poll-detected.

Accordingly, although the invention has been described by reference to certain preferred embodiments and certain methodology, it is not intended that the novel assembly or method be limited thereby, but that modifications thereof are intended to be included as falling within the broad scope and spirit of the following claims and the appended drawings.

I claim:

1. A light-emitting, diode lamp, the diode lamp for replacing a filament lamp, the diode lame comprising:
    a light-emitting diode;
    a load resistor, the load resistor being in series with the light-emitting diode for forming a two-component, first current path;
    a current-limiting diode; and
    a low resistance resistor, the low resistance resistor being in series with the current-limiting diode for forming a two component, second current path, a potential difference being applicable across the first and second current paths for driving current through said paths, enabling light emission from the light-emitting diode, and simulating a relatively low resistance through the diode lamp; and
    wherein the diode lamp is usable in combination with resistance detection means for detecting resistance through the diode lamp, the resistance detection means providing a lamp replacement signal when detecting a relatively high resistance through the diode lamp.

2. The diode lamp of claim 1 wherein the load resistor, current-limiting diode, and low resistance resistor simulate low resistance across the light-emitting diode, the simulated low resistance for preventing the lamp replacement signal via the resistance detection means.

3. The diode lamp of claim 2 wherein the low resistance resistor comprises a select resistance, the select resistance being selected from a resistance range, the resistance range ranging from 1 to 600 ohms.

4. A diode lamp, the diode lame for replacing a filament lamp, the diode lamp comprising:
    a light-emitting diode;
    a load resistor, the load resistor being in series with the light-emitting diode for forming a two-component, first current path;
    a Zener-diode;
    a capacitor, the capacitor being in parallel with the Zener diode for forming a voltage-decaying path segment; and
    a low resistance resistor, the low resistance resistor being in series with the voltage-decaying path segment for forming a three-component, second current path, a potential difference being applicable across the first and second current paths for driving current through said paths, enabling light emission from the light-emitting diode, and simulating a relatively low resistance through the diode lamp; and
    wherein the diode lamp is usable in combination with resistance detection means for detecting resistance through the lamp, the resistance detection means providing a lamp replacement signal when detecting a relatively high resistance through the diode lamp.

5. The lamp of claim 4 wherein the load resistor, Zener-diode, capacitor, and low resistance resistor simulate low resistance through the light-emitting diode, the simulated low resistance for preventing the lamp replacement signal via the resistance detection means.

6. The lamp of claim 5 wherein the low resistance resistor comprises a select resistance, the select resistance being selected from a resistance range, the resistance range ranging from 1 to 600 ohms.

7. The lamp of claim 6 wherein the capacitor comprises a select capacitance, the select capacitance being selected from a capacitance range, the capacitance range ranging from 4-10 picofarads.

8. A diode lamp assembly, the diode lame assembly for simulating a filament lame assembly, the diode lame assembly comprising:
    a light-emitting diode; and
    low-resistance-simulating means for simulating relatively low resistance across the light-emitting diode, a potential difference being applicable across the light-emitting diode and low-resistance simulating means for driving current therethrough and enabling light emission from the light-emitting diode; and
    wherein the diode lamp assembly is usable in combination with resistance detection means for detecting resistance through the diode lamp assembly, the resistance detection means providing a lamp replacement signal when detecting a relatively high resistance through the diode lamp assembly.

9. The diode lamp assembly of claim 8 wherein the low-resistance-simulating means are defined by first and second current paths, the first current path comprising a load resistor in series with the light-emitting diode, and the second current path comprising a low resistance resistor in series with a current-limiting diode, the first and second current paths for simulating a relatively low resistance across the light-emitting diode.

10. The diode lamp assembly of claim 9 wherein the low resistance resistor comprises a select resistance, the select resistance being selected from a resistance range, the resistance range ranging from 1 to 600 ohms.

11. A lamp monitoring method, the lamp monitoring method for testing a lamp socket, the method comprising the steps of:
 installing a diode lamp into a lamp socket;
 applying a potential difference across the diode lamp via the lamp socket;
 simulating a low resistance through the diode lamp; and
 polling the lamp socket for a high resistance signal from the diode lamp.

12. The method of claim 11 comprising the step of outputting a first signal if a low resistance is poll-detected.

13. The method of claim 12 comprising the step of outputting a second signal if a high resistance is poll-detected.

14. The method of claim 13 comprising the step of removing a filament lamp from the lamp socket before installing the diode lamp into the lamp socket.

15. A circuit-monitoring method, the circuit monitoring method for testing light-emitting diode circuitry, the method comprising the steps of:
 installing a light-emitting diode into a diode-lighting circuit;
 sending current through the diode-lighting circuit for emitting light from the light-emitting diode;
 simulating a low resistance through the light-emitting diode; and
 polling the diode-lighting circuit for a high resistance signal.

16. The method of claim 15 comprising the step of outputting a first signal if a low resistance is poll-detected.

17. The method of claim 15 comprising the step of outputting a second signal if a high resistance is poll-detected.

18. The method of claim 15 comprising the step of removing an incandescent filament from the diode-lighting circuit before installing the light-emitting diode into the diode-lighting circuit.

19. A light-emitting, diode lamp for replacing a filament lamp, the diode lamp comprising:
 a light-emitting diode;
 a load resistor, the load resistor being in series with the light-emitting diode for forming a first current path; and
 a resistance simulation circuit for forming a second current path in parallel with the first current path, the resistance simulation circuit being configured to simulate a resistance for the diode lamp such that the diode lamp appears as a filament lamp to a resistance detection circuit.

20. The diode lamp of claim 19 wherein the resistance simulation circuit comprises a capacitor in parallel with the first current path.

21. The diode lamp of claim 20 wherein the capacitor comprises a select capacitance, the select capacitance being selected from a capacitance range, the capacitance range ranging from 4-10 picofarads.

22. The diode lamp of claim 20 wherein the light-emitting diode, the load resistor and the resistance simulation circuit comprises a self-contained assembly for insertion in an aircraft light socket that is designed to receive a filament lamp.

23. The diode lamp of claim 22 further comprising the resistance detection circuit for communicating with the self-contained assembly via the socket, the resistance detection circuit being configured to output a signal indicative of the diode lamp not needing replacement in response to detecting a low resistance from the self-contained assembly.

24. The diode lamp of claim 23 wherein the resistance detection circuit is further configured to output a signal indicative of the diode lamp needing replacement in response to detecting a high resistance from the self-contained assembly.

25. The diode lamp of claim 22 wherein the resistance detection circuit comprises existing aircraft circuitry for testing whether an operational lamp is installed in the socket.

26. The diode lamp of claim 19 wherein the first current path is a two-component, first current path.

* * * * *